G. REISINGER.
CHUCK.
APPLICATION FILED MAR. 12, 1919.
1,348,740.
Patented Aug. 3, 1920.
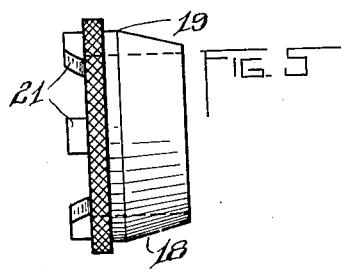
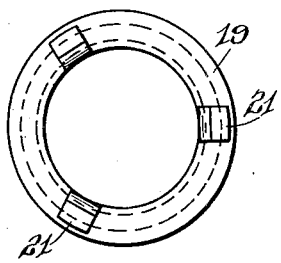
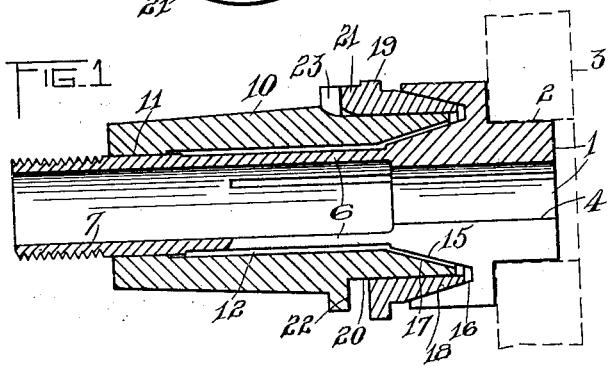
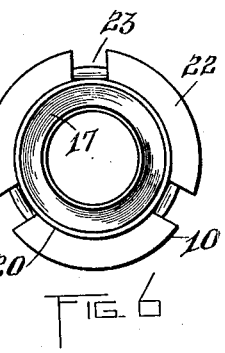
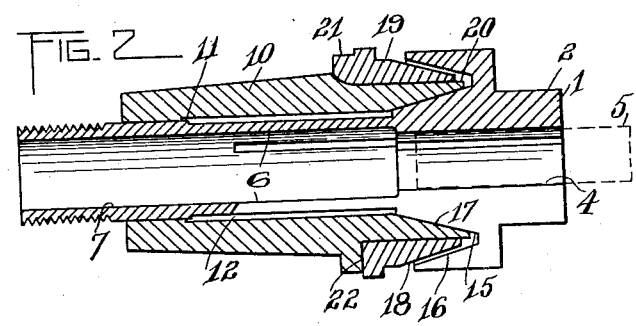
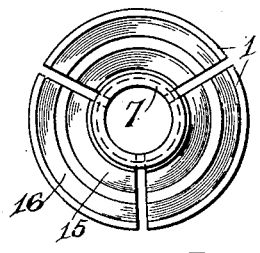
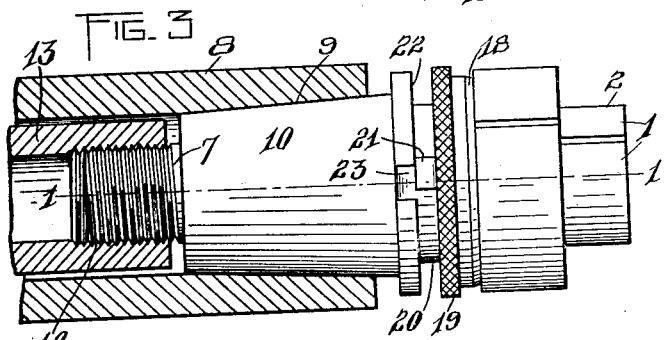
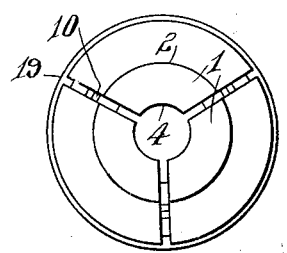
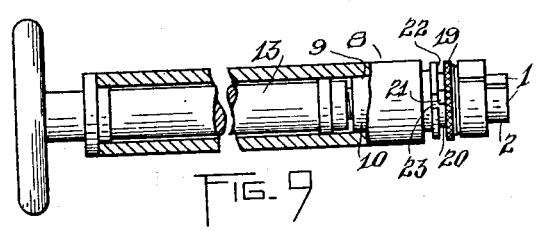
INVENTOR.
George Reisinger
BY
ATTORNEYS.

UNITED STATES PATENT OFFICE.

GEORGE REISINGER, OF ROCHESTER, NEW YORK.

CHUCK.

1,348,740.  Specification of Letters Patent.  Patented Aug. 3, 1920.

Application filed March 12, 1919. Serial No. 282,232.

*To all whom it may concern:*

Be it known that I, GEORGE REISINGER, a citizen of the United States, and resident of Rochester, in the county of Monroe and State of New York, have invented certain new and useful Improvements in Chucks, of which the following is a specification.

The present invention relates to chucks and more particularly to the type designed for use in lathes in which the chuck is supported upon a hollow spindle, an object of this invention being to provide a chuck which may be converted at will into an internal or external chuck so that the clamping jaws may be utilized for engaging the exterior or the interior of a work piece.

To this and other ends, the invention consists of certain parts and combinations of parts all of which will be hereinafter described, the novel features being pointed out in the appended claims.

In the drawings:

Figure 1 is a longitudinal section of the chuck adjusted for internal clamping and taken on the line 1—1 of Fig. 3;

Fig. 2 is a similar view but showing the chuck adjusted for external clamping;

Fig. 3 shows the chuck associated with the spindle and the operating member, the operating member and the spindle being in section while the chuck is in side elevation;

Figs. 4 and 5 are detail views of the bevel ring which effects the operation of the jaws for internal clamping;

Fig. 6 is an end view of the outer sleeve member as seen from the right with respect to Fig. 1;

Fig. 7 is an end view of the jaw carrying sleeve as seen from the left with respect to Fig. 2;

Fig. 8 is an end view of the chuck looking from the outer end thereof; and

Fig. 9 is a side view of the spindle with the chuck in position therein.

The chuck embodies a plurality of jaws 1 formed with external clamping surfaces 2 for engaging the interior of a work piece 3 and also formed with internal gripping surfaces 4 for engaging the exterior of a work piece 5. These jaws in this instance, are formed integrally with spring arms 6 made by slitting a hollow member or collet 7 which is provided in order that the rod or other work piece to be clamped exteriorly, may be extended therein. The hollow member or collet 7 is supported in one end of a spindle 8 and with this purpose in view, the spindle 8 is provided with a tapered interior wall 9 in which the externally tapered wall of a sleeve 10 fits, the sleeve projecting beyond the end of the hollow spindle and the collet 7 being guided at 11 within the sleeve 10, the internal diameter of the sleeve being increased beyond the bearing portion 11 and the external diameter of the collet 7 being decreased between the bearing portion 11 and the jaws in order to provide a space 12 in which the jaws may operate. The collet 7 is adapted to move axially in the sleeve 10 for the purpose of expanding or contracting the clamp as will be hereinafter more particularly set forth. The axial movement of the jaw carrying split collet 7 may be effected in any suitable manner as by a hollow operating rod 13 rotatably mounted in the spindle 8 and having a screw threaded connection 14 with the jaw carrying member 7 so as to produce the axial movement of the jaw carrying member.

To the end that the chuck may be expanded and contracted the jaws may be provided with two sets of beveled or cam faces, one set, indicated at 15, being employed for forcing the jaws together to make the jaws clamp a work piece exteriorly and the other set indicated at 16 being employed for moving the jaws away from each other to make the jaws clamp a work piece interiorly. For coöperation with the beveled faces 15 the sleeve 10 may be provided at its outer end with a tapered, beveled or cam portion 17 and to coöperate with the beveled faces 16 on the clamping jaws, there may be provided a beveled or cam face 18 on a ring 19 which turns on the cylindrical portion 20 formed on the sleeve 10. This ring when moved inwardly to one limit permits the beveled face 17 on the sleeve 10 to coöperate with the set of beveled faces 15 on the jaws when the jaw carrying sleeve is moved inwardly, and, when the ring 19 is moved outwardly to its other limit as shown in Fig. 1 to project beyond the sleeve 10, the beveled face 18 on the ring will coöperate with the set of beveled faces 16 on the jaws and move the jaws outwardly.

With the purpose in view of determining the position of the ring 19, the latter is provided on its inner face with a plurality of lugs or projections 21 adapted to coöperate in one position with an abutment or annular shoulder 22 formed on the sleeve 10. This abutment or annular shoulder is provided with a number of notches or recesses 23 corresponding to the number of lugs 21 and adapted to receive said lugs when the ring 19 is shifted so that the face of the ring may directly engage with the abutment 22. When the lugs engage the abutment the ring is projected beyond the end of the sleeve 10 as shown in Fig. 1 whereas when the lugs enter the recesses 23, the end of the sleeve 10 is projected beyond the end of the ring as shown in Fig. 2.

When the operator of the chuck desires to clamp a work piece interiorly, the ring 19 is turned to the position shown in Fig. 1 after which the operating rod 13 is turned to draw the jaw carrying member 7 inwardly so that the faces 16 and 18 coöperate to expand the chuck against the interior of the work piece 3. Should it be desired to clamp the work piece exteriorly, the ring 19 is adjusted to the position shown in Fig. 2 so that, when the jaw carrying member 7 is moved inwardly through the rod 13, the faces 15 and 17 will engage and force the jaws inwardly upon the work piece 5.

From the foregoing it will be seen that there has been provided a lathe chuck in which the jaws are formed with two sets of faces, one set for engaging the exterior of a work piece, and the other set for engaging the interior of a work piece. These jaws are controlled by two devices selectable at will, one for moving the jaws inwardly to cause the faces to engage the exterior of a work piece and the other for moving the jaws outwardly to cause them to engage the interior of a work piece. These devices are so constructed that the selecting operation is simple, permitting the chuck to be readily changed from one form of clamp to the other form. The structure as a whole is strong and durable and is not liable to get out of order.

What I claim as my invention and desire to secure by Letters Patent is:

1. A lathe chuck comprising a collet having spring jaws formed with clamping faces for engaging the exterior of a work piece and also with clamping faces for engaging the interior of a work piece, and two devices selectable at will, one for moving the spring jaws outwardly to engage the interior of a work piece and the other for moving the spring jaws inwardly for engaging the exterior of a work piece.

2. A lathe chuck comprising a hollow lathe spindle, a collet movable axially of the spindle and having jaws formed with internal and external gripping faces, and devices mounted on the spindle for coöperating with the collet for forcing the jaws outwardly or inwardly to cause either the outer or the inner gripping faces to clamp the work.

3. A lathe chuck comprising an externally tapered sleeve, a collet movable axially in the sleeve and having jaws formed with external and internal gripping faces, and relatively adjustable devices mounted on the externally tapered sleeve and adapted to coöperate at will with said jaws when the collet is moved axially, said coöperation effecting the movement of the jaws outwardly or inwardly to cause either the outer or the inner gripping faces to clamp the work.

4. A lathe chuck comprising an externally tapered sleeve, a collet movable axially in the sleeve and having jaws formed with internal and external gripping faces, a surface on said sleeve adapted to coöperate with said jaws to move them in one direction, and a ring adjustable on said externally tapered sleeve to coöperate with the jaws to move them in the other direction.

5. A lathe chuck comprising a hollow lathe spindle, a collet movable axially of the spindle and carrying jaws having internal and external gripping faces, and two devices carried by the hollow spindle and selectable at will, one of said devices coöperating with the jaws for moving the jaws outwardly for internal gripping and the other of said devices for coöperating with the jaws to move them inwardly for external gripping.

6. A lathe chuck comprising a hollow lathe spindle, a collet movable axially of said spindle and having jaws formed with internal and external gripping faces, said collet also having two sets of cam faces thereon, and two devices selectable at will, each for coöperating with one of said cam faces on the collet, one of said devices acting to move the jaws outwardly for internal gripping and the other of said devices acting to move the jaws inwardly for external gripping.

7. A lathe chuck comprising a hollow rotary lathe spindle having its inner wall tapered at one end, an externally tapered sleeve fitted in the tapered end of the lathe spindle, a collet having jaws formed with internal and external gripping faces and movable axially in said sleeve, said collet having two sets of cam faces thereon, one of which is adapted to coöperate with the externally tapered sleeve to move the jaws inwardly for external gripping, and a ring mounted upon the externally tapered sleeve and movable to coöperate with the other set of cam faces on the jaws for the purpose of moving said jaws outwardly for internal gripping.

8. A lathe chuck comprising an externally tapered sleeve, a collet split to provide a plurality of spring jaws formed with internal and external gripping faces, said collet being movable axially in the sleeve and having surfaces formed on its jaws to engage the sleeve to force the jaws in one direction, and a ring mounted on the sleeve and having a surface to engage the jaws to force them in the opposite direction when the collet is moved axially in the sleeve.

9. A lathe chuck comprising an externally tapered sleeve provided with an annular abutment formed with recesses, a collect having jaws formed with internal and external gripping faces and movable axially in the sleeve, the collet having its jaws formed with surfaces which engage the sleeve when the collet is moved axially in order to force said jaws in one direction, and a ring mounted upon the sleeve and provided with a plurality of projections adapted to lie within the recess or to coöperate with the annular abutment, said sleeve when lying in the recess being inoperative and when coöperating with the abutment, acting on the jaws to force them in the opposite direction.

10. A lathe chuck comprising an expansible and contractible collet having jaws formed with internal and external gripping faces, and means coöperating interchangeably with said collet for interchangeably forcing the jaws outwardly or inwardly by relative axial movement of said means and collet.

11. A lathe chuck comprising an expansible and contractible collet, having jaws formed with internal and external gripping faces, said collet also having two sets of cam faces, and means coöperating interchangeably with one or the other set of said cam faces of the collet for interchangeably forcing the jaws outwardly or inwardly by relative axial movement of said means and collet.

12. A lathe chuck comprising an expansible and contractible collet, having jaws formed with internal and external gripping faces, and means in constant coaxial arrangement with the collet for interchangeably forcing the jaws outwardly or inwardly by relative axial movement of said means and collet.

GEORGE REISINGER.